March 27, 1962 C. T. HELMES 3,027,462

APPARATUS FOR BRINGING TWO MOVING INDICIA MARKS INTO REGISTER WITH EACH OTHER

Filed May 19, 1959 5 Sheets-Sheet 1

March 27, 1962 C. T. HELMES 3,027,462

APPARATUS FOR BRINGING TWO MOVING INDICIA MARKS INTO REGISTER WITH EACH OTHER

Filed May 19, 1959 5 Sheets-Sheet 5

United States Patent Office 3,027,462
Patented Mar. 27, 1962

3,027,462
APPARATUS FOR BRINGING TWO MOVING INDICIA MARKS INTO REGISTER WITH EACH OTHER

Christiaan Theodoor Helmes, Tegelen-Steyl, Netherlands, assignor to Helmes' Machinefabriek, Tegelen-Steyl, Netherlands Filed May 19, 1959, Ser. No. 814,180
Claims priority, application Netherlands May 22, 1958
6 Claims. (Cl. 250—219)

Figure 1:
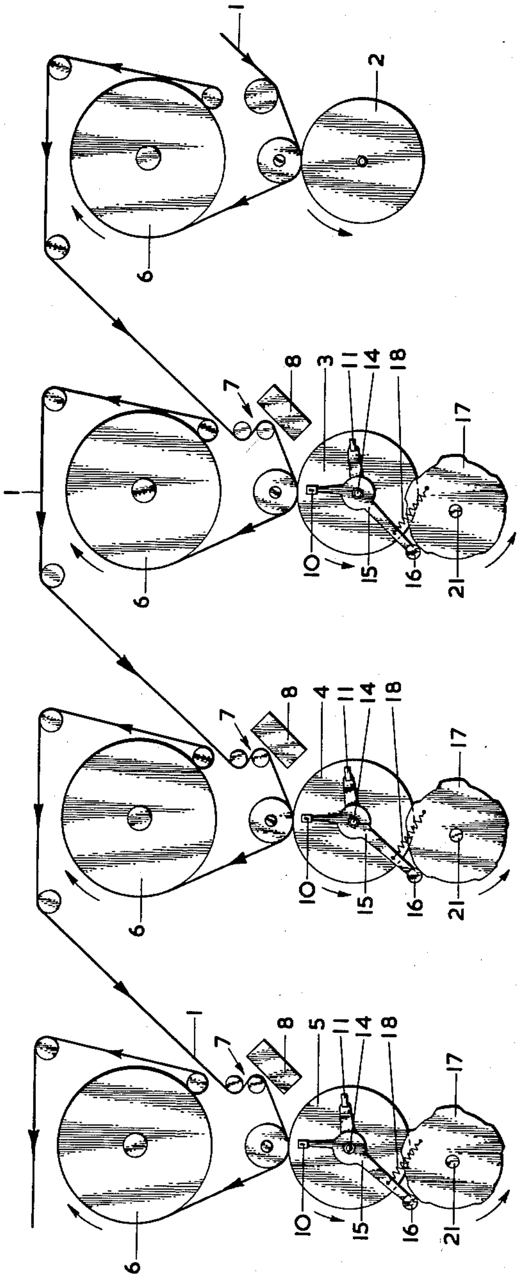

The invention relates to an apparatus for bringing two moving indicia marks into register with each other, said apparatus being provided with optical devices for observing and with a restoral (correction) mechanism for altering, if necessary, the relative position of the carrier of one of the indicia marks relatively to the carrier of the other indicia mark to be brought into register with it, said optical devices consisting of a stationary light-sensitive member which is adapted to receive an impulse (the so-called primary impulse) from the indicia mark moving past this member, further comprising an impulse sender for deriving from the carrier to be controlled a series of impulses (the so-called secondary impulses) with a frequency equal to the number of revolutions or to the speed of this carrier or a multiple of it, which secondary impulses are synchronous with the primary impulses if the relative position of the carriers of the two indicia marks is correct.

An apparatus of this kind can be used, for instance, in a multi-colour rotary printing machine, in a packaging machine, a loom, and similar apparatus in which several successive operations have to be carried out coordinately.

In the apparatus hitherto know the secondary impulses are compared with the primary impulses and the device for restoring the relative position of the carrier of one of the indicia marks remains inoperative while the two impulses are synchronous. However, if either one impulse or the other occurs earlier, the restoral mechanism has to come into operation. The duration or the intensity of the restoral has to be in direct proportion to the time interval between the two impulses. This proportion has to be maintained independently of the speed of operation of the apparatus, i.e. for instance of the speed of rotation of the printing cylinders in a multi-colour rotary printing machine. In the machines hitherto known this object is achieved by the use of fairly complicated electronic equipment.

The invention has for its object to furnish a structurally simple solution. The apparatus according to the invention is distinguished by the presence of devices for the superposition upon the series of secondary impulses of a cycle of oscillations which converge from a given initial value to a lower value, of a member which responds when a primary and a secondary impulse coincide (the so-called coincidence relay), and of an auxiliary device which causes the restoral mechanism to be operative in the correct direction and during an interval that is proportional to the observed deviation in the desired relative position of the two indicia marks. Through this measure in the case of a deviation from the correct relative position of the carriers of the two indicia marks at a given moment the primary and the secondary impulse will coincide, upon which the magnitude as well as the direction of the deviation will be determined automatically and consequently the duration and the nature of the restoral will be determined. By this means any incipient deviation exceeding a given minimum admissible value will at once be detected and restored.

The superposition of a cycle of oscillations upon the periodical secondary impulses may take place in two different ways. It is possible to alter the position of the impulse sender moving synchronously with the carrier to be controlled, but it is preferable to construct the apparatus in such a way that the devices for the superposition of the oscillations consist of a mechanism for adjusting the impulse sender synchronously with the carrier to be controlled, in such a way that the cycle of converging oscillations is derived from the secondary impulses. This solution has the advantage that oscillating movement is imparted to an otherwise stationary member.

A structural simple system is obtained if the impulse sender consists of a light-sensitive element with a light-source, between which a screen rotating synchronously with the carrier to be controlled is adapted to move, and if the position of the light-sensitive element in which the screen moves past it can be altered synchronously with the movement of the screen.

In a preferred embodiment of the apparatus according to the invention the screen is adapted to rotate about a shaft on which at the same time the light-sensitive elements has been pivotally mounted, devices being present for adjusting the angular position of the light-sensitive element synchronously with the rotation of the screen.

In order that the apparatus may be easily adaptable to work of widely varying kinds it is favourable to construct it in such a way that the devices for the adjustment of the light-sensitive element consist of an annular cam profile along which a roller connected with the element is adapted to move, the cam profile making one revolution per cycle of the oscillations. By the replacement of the cam profile the cycle of oscillations can be altered and thus an adaptation to the nature of the restoral to be carried out may be obtained.

According to the invention the auxiliary device which causes the restoral mechanism to be operative in the correct direction and for the requisite duration is formed by two switches which are controlled by the coincidence relay, each of which switches may cause the restoral mechanism to move in a different direction, while furthermore a selection device is present which invariably blocks one of the switches, according to the direction of the oscillation, and which returns the switches to their position of rest at the end of the cycle of the oscillations. By this measure a simple solution is obtained by mechanical means for the determination of the direction in which the restoral has to be carried out and of the duration of this restoral.

The selection device preferably consists of a number of cam discs mounted coaxially with the annular cam profile, which discs cooperate with two levers, each of which controls one of the switches and both of which are kept locked in an inoperative position by the coincidence relay, these cam discs having relatively alternating (staggering) profiles in accordance with the amplitude direction of the oscillation.

The invention will be explained in greater detail with reference to the drawing, which illustrates a multi-colour rotary printing machine provided with the restoral mechanism according to the invention.

Figures 2, 3A:
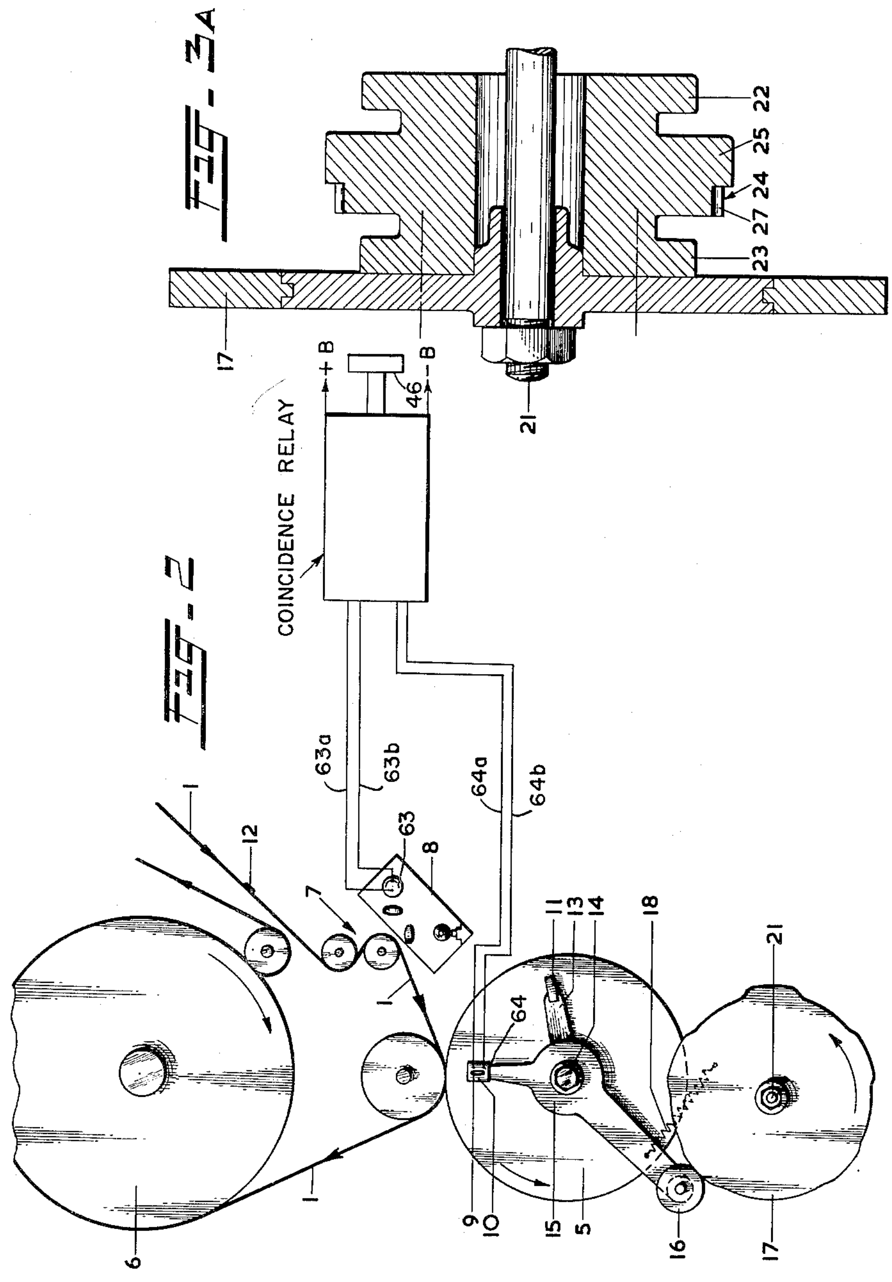

FIGURE 1 is a diagrammatical side elevation of the multi-colour rotary printing machine, FIGURE 2 is a diagrammatical side elevation on an enlarged scale of part of this machine with the two impulse senders.

Figure 2A:
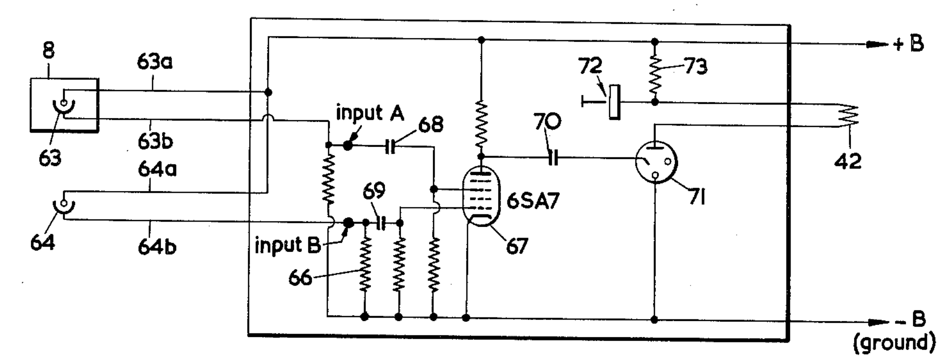

FIGURE 2*a* is a circuit diagram of the coincidence relay.

Figure 3:
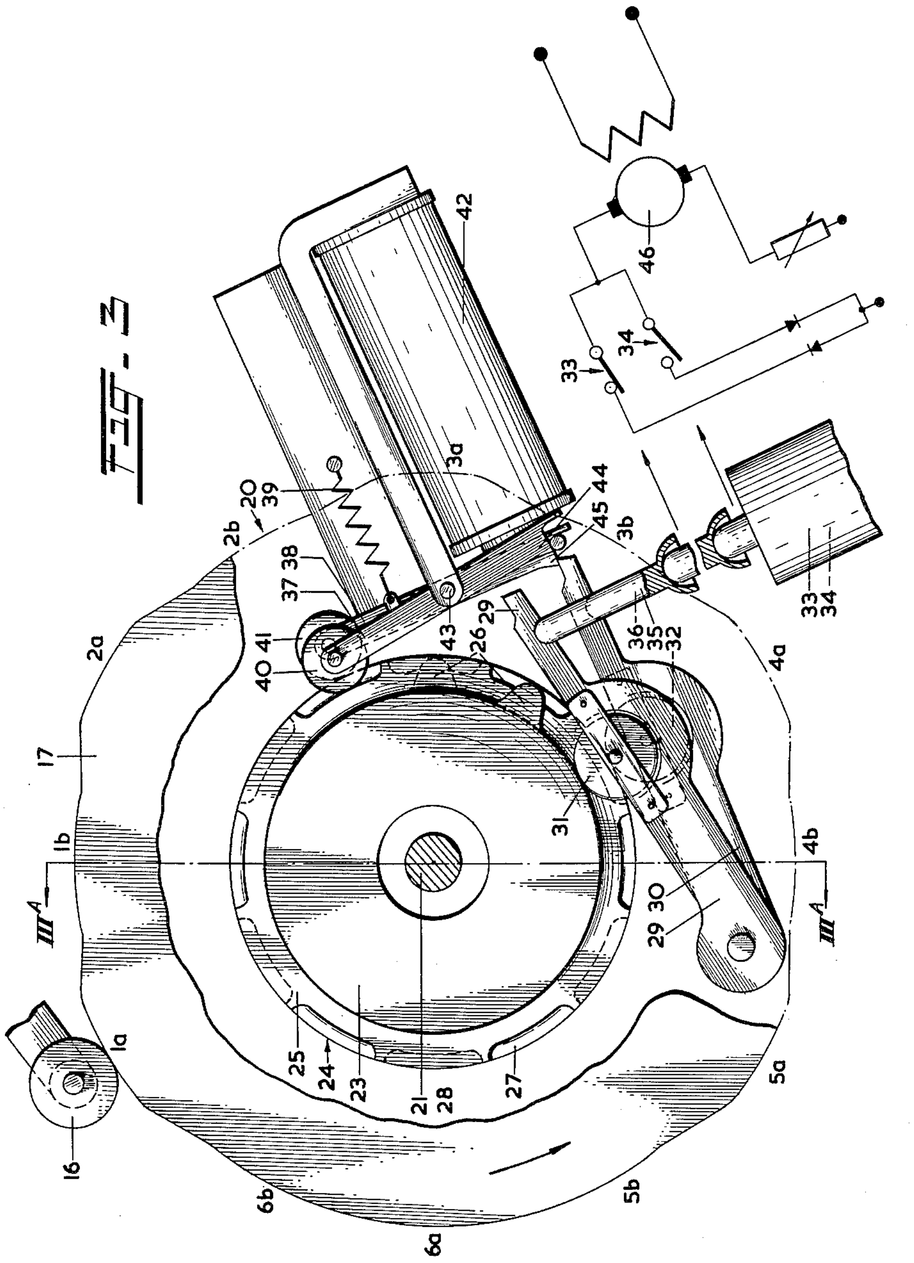

FIGURE 3 is a side elevation on an even further enlarged scale of part of the apparatus according to the invention, in which in particular the auxiliary device is shown.

FIGURE 3*a* shows a detail of FIGURE 3 in the transverse direction.

FIGURES 4*a* and 4*b* show diagrammatically the progress of the cycle for a situation in which respectively no deviation occurs and a deviation does occur in the relative position of the two carriers of the indicia marks.

Figure 5:
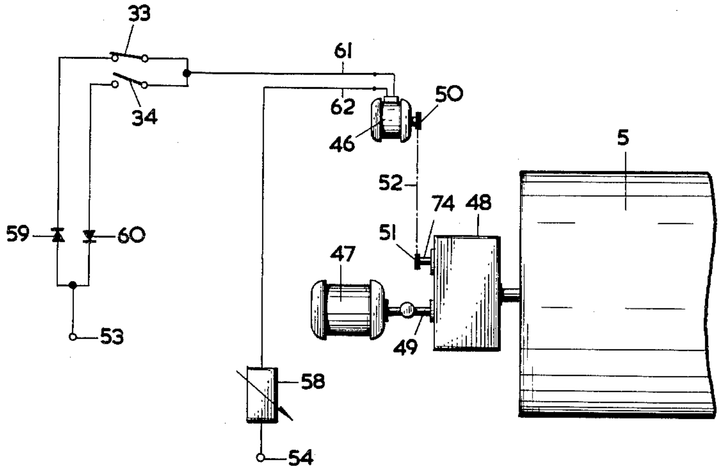

FIGURE 5 is a schematic showing of the means for accomplishing automatic restoral of the printing cylinder 5.

As may be seen in FIGURE 1, a paper web 1 moves successively past a number of printing rollers 2–5 for making, for instance, successive impressions in the colours yellow, red, blue, and black. After having moved past each of these printing cylinders, the paper web is passed along a drying roller 6. Before reaching the printing cylinders 3–5, the paper web moves past a group of rollers 7, in which has been incorporated, among other things, a stationary light-sensitive member 8 for scanning the paper web and receiving an impulse from an indicia mark that has been printed on the paper web moving past this member by a preceding printing cylinder.

With a view to determining the correct relative angular position of the printing cylinders 3–5 relatively to the impression made by the preceding printing cylinder(s) an impulse is derived from each of the cylinders 3–5 in such a position of the printing cylinder in question that when the secondary (cylinder) impulse is synchronous with the primary (web) impulse derived from the member 8, the impression to be made by the printing cylinder in question coincides with the impressions made by the preceding printing cylinder(s).

As may be seen in FIGURE 2, the impulse sender 9 for the cylinder impulses consists of a light-sensitive element 10 with a light-source, between which a screen 11 rotating synchronously with the printing cylinder in question is adapted to move. The element 10 with the light-source may oscillate to either side of a previously determined mean position. The length of the arc shown in this figure between the screen 11 and the mean position of the element 10 is equal to the distance between the indicia mark 12 on the paper web 1 and the stationary light-sensitive member 8, at least when the relative angular position of the printing cylinder is correct relatively to the paper web.

The screen 11 is adapted to rotate by means of an arm 13 about a shaft 14, on which at the same time the light-sensitive element 10 has been pivotally mounted. To this end the said element 10 has been secured on a supporting member 15. One of the ends of this member 15 is fitted with a roller 16 resting on a cam profile 17. By means of a spring 18 the roller is permanently urged against the profile. This profile thus determines the position of the element 10, and accordingly the moment at which the cylinder impulse is transmitted (by the screen 11 moving past).

If the light-sensitive element 10 were to be kept in its mean position as indicated by a line of dots and dashes in FIGURE 2, the cylinder impulse would be transmitted regularly, so that a series of impulses with a constant time interval would be produced. By means of the cam profile 17 a cycle of oscillations is superimposed upon this series, viz by the process of imparting a cycle of oscillations to the element 10, which oscillations converge from a given initial value to a lower value. To achieve this, the cam profile 17 is driven at a rate that is considerably smaller than the speed of the printing cylinder(s). In the embodiment shown in the drawing the speed ratio is 1 to 12, i.e. the cam profile 17 performs one rotation against 12 revolutions of the printing cylinder.

The frequency of the oscillations is equal to twice the number of revolutions of the screen 11. Whenever this screen moves past the light-sensitive element 10, the latter is in a different position, the various positions being determined by the cam profile 17. This profile has been constructed in such a way that the light-sensitive element 10 successively makes a large deflection to the left and to the right of the mean position, then a slightly smaller deflection to the left and to the right, subsequently three times a slightly smaller deflection to the left and to the right again, and finally the smallest deflection to the left and to the right.

Owing to the superposition of this cycle of oscillations upon the series of cylinder impulses, with a correct relative position of the indicia marks 12 on the paper web 1 the web impulses caused by this will not coincide with one of the cylinder impulses, since these cylinder impulses are invariably received slightly before or slightly after the arrival of each web impulse. The restoral mechanism accordingly is not put into operation and the paper web 1 moves in a correct relative position past the printing cylinder 5.

As soon as the position of the indicia mark 12 is no longer correct, the web impulse derived from the light-sensitive member 8 may coincide with one of the cylinder impulses derived from the impulse sender 9. In the case of such coincidence an auxiliary device to be described hereinafter will ascertain in what direction a restoral of the paper web 1 has to be carried out and of what magnitude this restoral has to be.

The auxiliary device 20 is illustrated in FIGURE 3. The cam profile 17 is mounted on a shaft 21, on which in addition four cam discs 22–25 have been fitted (see also FIGURE 3*a*). The shaft 21 is driven via a reduction gearing (not shown in the drawing) in a speed ratio of 1:12 from the shaft 14 (see FIGURE 2). The cam profile 17 has six high and six low points, staggered over an arc of 30°. In one place the cam discs 24 and 25 are provided with six recesses 27 and 28 respectively, distributed regularly along the circumference, the relative angular position of the two sets of recesses 27 and 28 being staggered over 30° relatively to each other.

At some distance from the shaft 21 two switch levers 29 and 30 are fitted pivotally on the frame of the auxiliary device. Each of these levers is provided with a roller 31 and 32 respectively. The roller 31 rests on the outer circumference of the came disc 23, while the roller 32 rests on the cam disc 22. At their free ends the levers 29 and 30 are connected with switches 33 and 34 respectively via intermediate rods 35 and 36 respectively. By means of a spring not shown in the drawing the two levers 29 and 30 are urged against the circumference of the cam disc in question.

The levers 29 and 30, however, are blocked in an inoperative position by means of a locking pawl constructed as two-armed levers 37 and 38 respectively. In FIGURE 3 the lever 30 is in this inoperative position. The levers 37 and 38 are pulled into the locking position by means of a spring 39. At their free ends these levers are provided with rollers 40 and 41 respectively, which rollers are adapted to cooperate with the cam discs 25 and 24 respectively.

In the auxiliary device 20 finally a coincidence relay 42 is present, i.e. a member, e.g. a magnet coil, which responds (via thyratron) when a primary and a secondary impulse coincide. The levers 37 and 38 pivot about a point 43 forming part of the frame of the relay 42. When the relay responds, the ends of the levers 37 and 38, which are provided with locking cams 44 and 45 respectively, are pulled towards the relay. A movement of the levers 37 and 38 is possible only when one of the recesses 27 or 28 lies underneath one of the rollers 40 and 41 respectively. Since these recesses are staggered relatively to each other, invariably only one of the levers 37 and 38 can be attracted by the relay 42 against the action of the spring 39. Through this movement the locked lever 29 or 30 is released and the respective roller 31 or 32 is pulled through spring action against the corresponding cam disc 23 or 22, as a result of which the switch 33 or 34 is operated. In the position shown in FIGURE 3 the lever 37 has been moved and consequently the lever 29 has been released, as a result of which the switch 33 has ben actuated. Through the closing of the switch 33 a motor 46 of the restoral mechanism has been energized. This motor drives the printing cylinder 5 via a differential gear and thus restores the deviation of this cylinder relatively to the paper web 1. The motor 46 continues to run until the cam 26 of the cam disc 23 forces back again the switch level 29. The latter then snaps behind the pawl tooth 45 of the lever 37 again and thus remains locked. The time the motor 46 runs is thus dependent on the place where the raised portions 26 of the discs 22 and 23 are situated relatively to the rollers 31 and 32 respectively of the switch levers 29, 30 at the moment the relay 42 is energized. If the lever 30 has been attracted, in accordance with the above description the switch 34 would have been connected. In that case the motor 46 is also energized, but the direction of the movement is then reversed.

Since in the cam discs 24 and 25 six recesses each, 27 and 28 respectively, are present, it follows that the restoral movement by means of the motor 46 may be of shorter or longer duration, dependent on the place where the roller 31 or 32 arrives on the outer circumference of the cam disc 22 or 23 and on the length of the arc up to the raised portion 26. In this connection substantially six places are to be distinguished, which places correspond to the six recesses 27 or 28 into which the rollers 40 or 41 can drop when the coincidence relay 42 responds. The greatest length of the arc will naturally correspond to the oscillation of the impulse sender 9 with the greatest amplitude, while the smallest length of the arc corresponds to the last oscillation of the cycle, i.e. the oscillation with the smallest amplitude.

If a considerable deviation in the position of the paper web has arisen, the web impulse will coincide with the cylinder impulse at the very first oscillation of the cycle, and the restoral motor 46 will then run during almost a complete revolution of the shaft 21. If the deviation is smaller, the impulses will be synchronous at another moment of the cycle, in which case the motor will run for a shorter time, since it will then be disconnected relatively earlier owing to the raised portion 26 moving past the roller 31 or 32.

Figure 4:
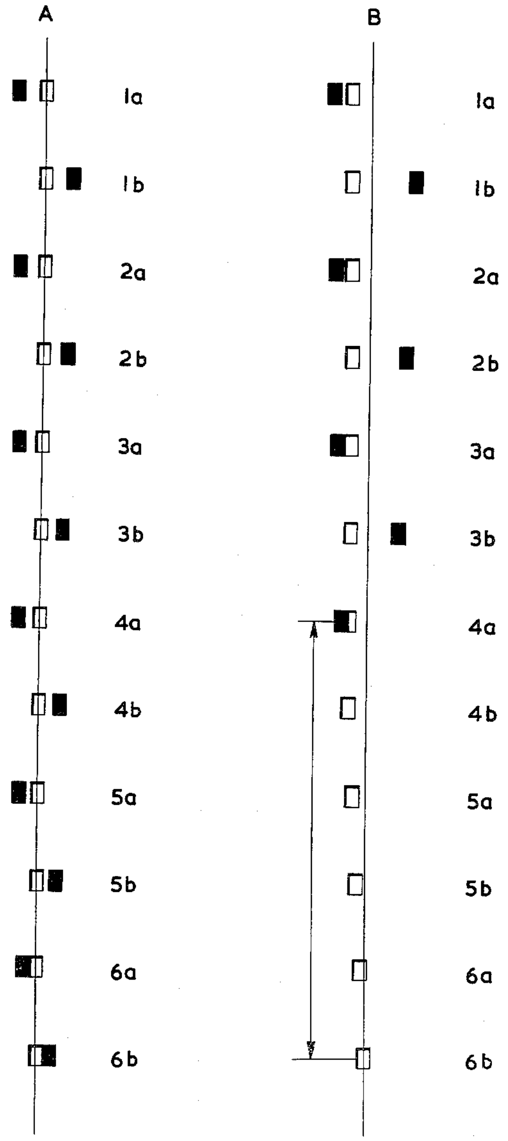

FIGURE 4 shows diagrammatically the progress of the cycle of oscillations when the position of the paper web relatively to the printing cylinder is correct (part *a*) and in the case of a deviation in the relative position of these two carriers (part *b*). By way of further illustration it has been indicated along the circumference of the cam profile 17 in FIG. 3 which are the points corresponding to the positions of the oscillating cylinder impulses from FIG. 4.

It is observed that the restoral mechanism need not act exclusively on the printing cylinder(s). The restoral may also affect the carrier of the other indicia mark, i.e. be carried out on the paper web, e.g. by means of an adjustable tension roller along which the paper web moves.

Referring now to FIGURE 2*a*, it will be seen that a suitable coincidence relay circuit may include leads **63*a* and 63*b* connecting the photocell 63 of the previously described member 8 to the circuit. Similarly, the photocell 64 of previously discussed element 10 is connected to the circuit by leads 64*a* and 64*b*. One lead of each photocell 63 and 64 is connected to a source of high potential indicated as +B and the other leads being connected to ground as shown. When a light beam hits the photocell, the potential on the connection 63*b* or 64*b* suddenly increases and a positive impulse appears at the points indicated by input A or input B. When a positive potential exists at both inputs A and B, the tube 67 will conduct; tube 67 will not conduct when a potential exists at only one of the inputs A and B. It will be noted that the two control grids of the tube 67 are respectively connected by condensers 68 and 69 to their inputs A and B. When the tube conducts, a negative impulse will appear at its anode, the anode being coupled through condenser 70 to the starter electrode of a thyratron 71. Thyratron 71 then conducts current through the relay 42, the current being supplied by a condenser 72 which is charged through a resistance 73. Flow of current through the relay 42 will actuate either locking cam 44 or 45 to accomplish closing of switch 33 or 34 to cause operation of the motor 46, which in turn will restore the printing cylinder 5** to its correct synchronized position. It will be noted that these features are shown also in schematic form in FIGURE 2.

FIGURE 5 shows the printing cylinder 5 and, schematically, the controlling mechanism for driving the roller and adjusting its position into a synchronized position. The printing cylinder 5 is normally driven by motor 47 through connection 49 and differential gear 48. Adjustment of the printing cylinder 5 is accomplished through motor 46 connected through chain wheels 50 and 51 and chain 52 through shaft 74 to the differential gear 48. Electrical power is supplied to motor 46 from an alternating current source having terminals 53 and 54, adjustable resistor 58 being employed to regulate the speed, the connections to the motor being shown through connectors 61 and 62.

In the lead from terminal 53 to brush connector 61 is a parallel circuit involving in one leg a diode 59 and switch 33 and in the other leg, a diode 60 and switch 34. It will be noted that the diodes 59 and 60 are connected in an opposite direction to each other whereby the rectifying action of the diodes will cause the current to flow in opposite directions in accordance with the closed condition of switch 33 or 34. When switch 33 is closed (switch 34 being open), a direct current will flow to the motor in one direction, while the flow of current will be in the opposite direction when switch 34 is closed and switch 33 is open. In this manner the direction of rotation of the motor 46 is controlled and, as previously mentioned, the duration of rotation of motor 46 will be controlled in accordance with the mechanical control means of FIGURE 3.

What I claim is:

1. An apparatus for bringing two moving indicia marks into register with each other comprising observing means for producing a primary impulse when an indicia passes a predetermined position, moving means for the other indicia mark, mechanical control means operatively associated with and predeterminedly moved by said moving means for producing a series of secondary impulses, said series being made up of alternate impulses derived from positions on opposite sides of a predetermined mean position identifying synchronism of said indicia marks, and said series of secondary impulses having a cycle of oscillations which converges from an initial value to a lower value, coincidence relay means operatively associated with said control means to be actuated upon coincidence of a primary impulse and a secondary impulse, and an auxiliary means operatively associated with said moving means and responsive to actuation of said coincidence relay means to cause automatic restoral in the correct direction and distance proportional to an observed deviation in the desired predetermined relative position of the two indicia marks.

2. An apparatus according to claim 1, characterized in that said control means includes a secondary impulse sender having a light and light-sensitive element, a screen rotatably mounted for movement between said light and said light-sensitive element, the rotation of said screen being synchronized with said moving means, and means for altering the position of said light and light-sensitive element in a predetermined cyclic manner synchronous with movement of the screen.

3. An apparatus according to claim 2 characterized in that said light and light-sensitive element are pivotally mounted coaxially with said screen.

4. An apparatus according to claim 3 characterized in that said means for altering the position of said light and said light-sensitive element comprise a cam means synchronized with said moving means to make one revolution per cycle of oscillations.

5. An apparatus according to claim 4 characterized in that said auxiliary means includes two switches operatively connected to said coincidence relay means, the switches controlling their respective forward and rearward restoral movement, and a selection means operatively connected to said moving means for invariably blocking movement of one of the switches according to the direction of the oscillation and for returning the moved switch to its position of rest at the end of the cycle of the oscillations.

6. An apparatus according to claim 5 characterized in that said selection means comprises a pair of cam discs mounted coaxially with said cam means, switch operating levers operatively connecting their respective switches to the respective cam discs, said coincidence relay means releasably locking said levers in inoperative position, said cam discs having relatively alternating profiles in accordance with the amplitude direction of the oscillation.

References Cited in the file of this patent

UNITED STATES PATENTS

| | | |
|---|---|---|
| 2,205,255 | Gulliksen | June 18, 1940 |
| 2,278,933 | Kott | Apr. 7, 1942 |
| 2,289,737 | Sorkin | July 14, 1942 |
| 2,348,862 | Sorkin | May 16, 1944 |
| 2,400,447 | Wells et al. | May 14, 1946 |
| 2,522,479 | Crafts | Sept. 12, 1950 |
| 2,840,371 | Frommer | June 24, 1958 |